United States Patent [19]
Walker

[11] Patent Number: 5,966,235
[45] Date of Patent: Oct. 12, 1999

[54] MICRO-MECHANICAL MODULATOR HAVING AN IMPROVED MEMBRANE CONFIGURATION

[75] Inventor: James Albert Walker, Howell, N.J.

[73] Assignee: Lucent Technologies, Inc., Murray Hill, N.J.

[21] Appl. No.: 08/940,249

[22] Filed: Sep. 30, 1997

[51] Int. Cl.⁶ .............. G02B 25/00; G02F 1/01; B02B 26/08
[52] U.S. Cl. .......... 359/291; 359/290; 359/295; 359/298; 359/318
[58] Field of Search .................. 359/290, 291, 359/295, 298, 318

[56] References Cited

U.S. PATENT DOCUMENTS

| | | | |
|---|---|---|---|
| 3,479,109 | 11/1969 | Preston | 359/295 |
| 5,500,761 | 3/1996 | Goossen | 359/291 |
| 5,646,772 | 7/1997 | Yurke | 359/295 |
| 5,654,819 | 8/1997 | Goosen et al. | 359/291 |
| 5,757,536 | 5/1998 | Ricco et al. | 359/295 |

*Primary Examiner*—Georgia Epps
*Assistant Examiner*—Margaret Burke

[57] ABSTRACT

An optical modulator that contains a flexible dielectric membrane suspended over a substrate. The flexible membrane is made of a dielectric material such as silicon nitride. In one embodiment of the invention, the flexible membrane has an optically active region. A contact region is maintained in the vicinity of the optically active region which is electrically isolated therefrom. The contact region which includes a conductive material draws accumulated charge build-up from the optically active region. In another embodiment a first area of conductive material is formed on at least one surface of the flexible membrane proximate its center. At least one second area of conductive material is formed on at least one surface of the flexible membrane surrounding the first area. The first area of conductive material is kept electrically isolated from the surrounding second area. The first area of conductive material is coupled to an electrical ground. When an electrical potential is applied between the flexible membrane and the below-lying substrate, only the second areas of conductive material are affected. As a result, only the second areas of conductive material act to deform the membrane. The first area of conductive material in the center of the membrane remains unaffected and ensures that the membrane deforms in a uniform manner.

24 Claims, 2 Drawing Sheets

MICRO-MECHANICAL MODULATOR HAVING AN IMPROVED MEMBRANE CONFIGURATION

RELATED APPLICATION

The present application is related to U.S. Pat. No. 5,654,819, entitled Improved Micromechanical Modulator (Goosen 32-23), issued Aug. 5, 1997 and being incorporated herein by reference.

BACKGROUND OF THE INVENTION

1. Field of the Invention

The present invention relates to micro-mechanical modulators that are used to modulate light signals propagated by optical fibers. More particularly, the present invention relates to surface normal mechanical optical modulators and the structure of the membranes used by such modulators.

2. Description of the Prior Art

In many optical wavelength division multiplexing systems it is desirable to have inexpensive optical modulators that have high contrast and wide optical bandwidths. One such modulator is a surface normal micro-mechanical modulator, sometimes referred to as a mechanical antireflection switch (MARS) modulator. Such modulators have a variable air gap defined between a substrate and a membrane. Typically, MARS modulators operate by selectively changing the amount of light reflected in the surface normal direction, i.e., the direction normal to the substrate below the membrane. This is done by varying the size of the air gap that exists in between the substrate and the membrane, thereby altering the optical properties of the device.

Since the optically active area of the membrane is not coated with a metal film, an electric charge can build upon the dielectric silicon nitride film in this area due to surface and bulk migration of charges. The build up of charges in the optically active area of the membrane changes the required voltage needed to accurately operate the MARS modulator. Inaccurate operation of the MARS modulator can adversely affect operation of the entire optical network.

A need, therefore, exists for an improved MARS modulator where surface charges are prevented from collecting on the optically active area of its membrane.

SUMMARY OF THE INVENTION

The present invention is an optical modulator and its associated method of manufacture. The modulator contains a flexible dielectric membrane suspended over a substrate. By creating an electrical potential between the flexible membrane and the substrate, the gap in between the membrane and the substrate can be altered, thereby altering the optical properties of the device. The flexible membrane is made of a dielectric material such as silicon nitride.

In one embodiment of the invention, the flexible membrane has an optically active region. A contact region is maintained in the vicinity of the optically active region which is electrically isolated therefrom. The contact region which includes a conductive material draws accumulated charge build-up from the optically active region.

In another embodiment, a first area of conductive material is formed on either the top, bottom or both surfaces of the flexible membrane proximate its center. At least one second area of conductive material is formed on one or both surfaces of the flexible membrane surrounding the first area. The first area of conductive material is kept electrically isolated from the surrounding second area.

The first area of conductive material is maintained at a different electrical potential than the second area, for example at ground potential. When an electrical potential is applied between the flexible membrane and the below-lying substrate, only the second areas of conductive material are affected. As a result, only the second areas of conductive material act to deform the membrane. The first area of conductive material in the center of the membrane remains unaffected and ensures that the membrane deforms in a uniform manner. The presence of the conductive material over the membrane prevents static charges from forming on the membrane, thereby eliminating variations in performance than can be caused by stored static charges.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
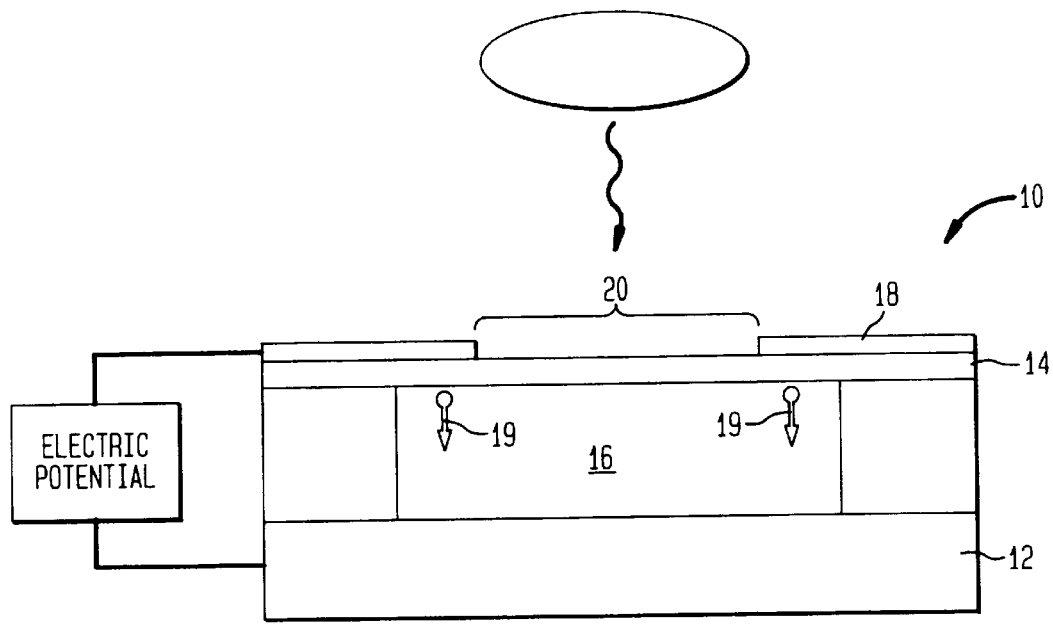
FIG. 1 is a side cross-sectional view of an embodiment of a typical prior art MARS modulator.

A typical prior art MARS modulator is shown in FIG. 1. The MARS modulator 10 has a conductive or semiconductive base substrate 12. A membrane 14 is suspended above the substrate 12, thereby defining an air gap 16 in between the substrate 12 and the membrane 14. The membrane 14 is typically fabricated from a silicon nitride film which is a dielectric. A metal film 18 is deposited around the top periphery of the membrane 14. Since the metal film 18 is optically opaque, only the center of the membrane 14 remains optically active. When an electrical potential is applied between the metal film 18 and the below-lying substrate 12, the metal layer becomes charged and is biased toward the substrate 12. The result is that the membrane 18 deflects downwardly in the direction of arrows 19 and the size of the air gap 16 is reduced. Since the metal film 18 is not present over the optically active area 20 of the MARS modulator 10, no deflection forces are experienced in the optically active area 20 of the membrane 14 when the electrical potential is applied. The result is an optically active area 20 in the membrane 14 that provides substantially uniform optical reflectivity regardless of the degree of deflection, the size of the air gap 16 or the degree of electrical potential applied.

Since the optically active area 20 of the membrane 14 is not coated with the metal film 18, an electric charge can build upon the dielectric silicon nitride film in this area due to surface and bulk migration of charges. The build up of charges in the optically active area 20 of the membrane 14 changes the required voltage needed to accurately operate the MARS modulator 10. Inaccurate operation of the MARS modulator 10 can adversely affect operation of the entire optical network.

Figure 2:
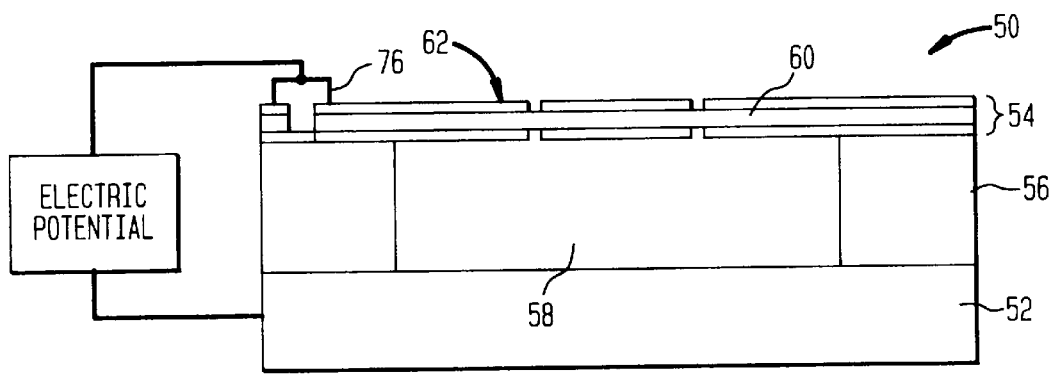
FIG. 2 is a side cross-sectional view of an embodiment of an improved MARS modulator in accordance with the present invention.

Referring to FIG. 2, there is shown an exemplary embodiment of an improved MARS modulator 50 in accordance with the present invention. The improved MARS modulator 50 contains a substrate 52. The substrate 52 is formed of a conductive or semiconductive material that is either transparent or absorbing to the operating optical bandwidth of the modulator. Suitable substrate materials include, but are not limited to, silicon, gallium arsenide, indium phosphate, germanium or indium tin oxide coated glass. If a semiconductor material is used for the substrate, the semiconductor material preferably should be appropriately doped. For example, if the substrate 52 is silicon, the silicon should be doped with a Group III or Group V element such as phosphorous or boron to enhance operational performance, as would be understood by a person skilled in the art.

A membrane structure 54 is supported over the substrate 52. The membrane structure 54 is separated from the substrate 52 by a dielectric spacer layer 56. The membrane structure 54, substrate 52 and spacer layer 56 define an air gap 58 that extends between the membrane structure 54 and the substrate 52.

The membrane structure 54 consists, for example, of a silicon nitride layer 60, such as that used in prior art MARS modulators. However, polysilicon film 62 is present along the top surface and bottom surface of the silicon nitride layer 60. The polysilicon film 62 is deposited in a pattern that will later be explained. The thickness of the polysilicon film 62 is thin enough to be substantially transparent. Although the polysilicon film 62 is shown as being deposited on both sides of the silicon nitride layer 60 in FIG. 2, in alternate embodiments of the invention, the polysilicon film may be deposited on only one surface of the silicon nitride layer 60, e.g., on either the top or bottom surface. Also, rather than being deposited so as to be substantially transparent, the thickness of the polysilicon film 62 may be tailored to be part of the optical design of the modulator 50, for example, so that the thickness of the membrane structure 54 is a multiple of one quarter of the basis or operating wavelength of the modulator, or another suitable fraction of that wavelength. As would be understood, the optical effect in passing light caused by the presence of the polysilicon film 62 is a constant that can be compensated for in the overall optical design of the modulator 50.

The polysilicon film 62 is conductive and, consequently, by placing the polysilicon film 62 across the silicon nitride layer 60, static charges are prevented from forming. By eliminating the development of static charges on the membrane structure 54, the membrane structure 54 responds to different electrical potentials in a consistent manner. Other suitable conductive materials, such as indium tin oxide, may also be utilized in combination with the silicon nitride layer as part of the membrane structure 54, and in place of the polysilicon film 62.

In the embodiment of FIG. 2, the prior art metal film shown in the embodiment of FIG. 1 need not be present. Rather, since the polysilicon film 62 (or other suitable material such as indium tin oxide) is conductive, it can be charged and the polysilicon film 62 itself can deform the membrane structure 54 when an electrical potential is applied. However, if conductive polysilicon films were just uniformly applied to the membrane structure, a non-uniform deformation would occur in the presence of an electrical potential. If the membrane structure deforms in a non-uniform manner, the air gap beneath the membrane structure would also not be uniform. The result is a varied reflection from the MARS modulator, thereby creating a defective modulator that would not function properly.

To prevent the polysilicon films 62 from deforming the membrane structure 54 in a non-uniform manner, the polysilicon films 62 are not evenly applied across the top surface and bottom surface of the silicon nitride layer 60. Rather, the polysilicon layers 62 are applied in a pattern that is designed to result in a near uniform deformation in the presence of an applied electrical potential.

Figure 3:
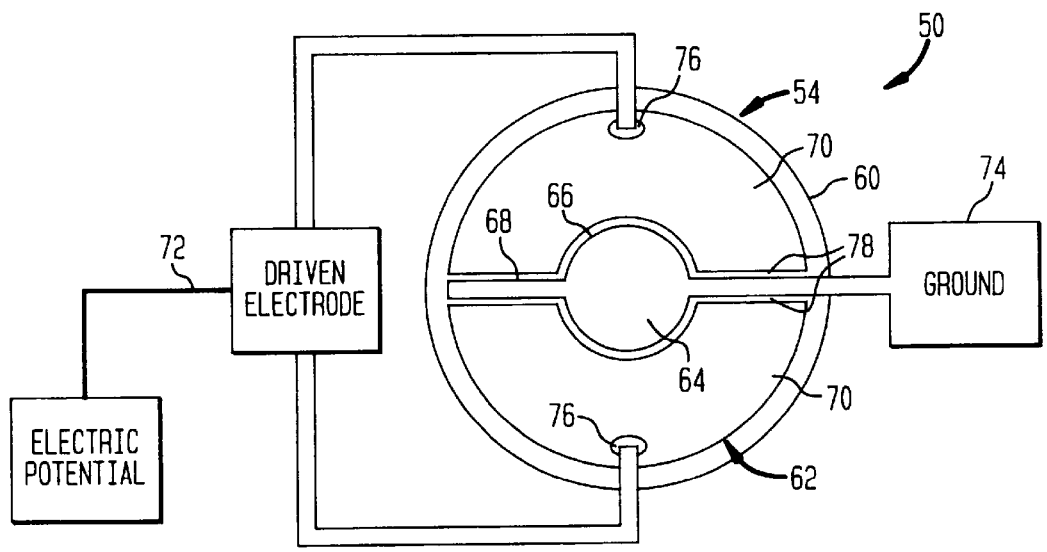
FIG. 3 is a top view of the embodiment of the improved MARS modulator shown in FIG. 2.

Referring to FIG. 3, it can be seen that the polysilicon films 62 are deposited onto the silicon nitride layer 60 in a plurality of different regions. In the shown embodiment, two regions are used. However, it should be understood that more than two regions can also be used. Regardless of the number of regions used, each region is preferably coupled to an electrode with an independent lead. In the shown embodiment, a first central region 64 of polysilicon film is disposed in the center of the membrane structure 54. For a circular drumhead MARS modulator 50, such as that shown, the central region 64 of polysilicon film comprises a circular center 66 with a traverse line 68 that extends across the center of the membrane structure 54. Two peripheral regions 70 of polysilicon film surround the central region 64. In the shown embodiment, the peripheral regions 70 are semi-annular in shape. The peripheral regions 70 of the polysilicon film are coupled to a driven electrode 72. The central region 64 of the polysilicon film is coupled at a driven electrical potential, for example, to a ground electrode 74. The purpose of the different electrodes is later explained. Bonding vias 76 may also be present as part of the membrane structure 54. The bonding vias 76 extend down through the silicon nitride layer 70 (see FIG. 2) and act to electrically connect the different regions on the bottom of the membrane structure 54 to the corresponding regions on the top of the membrane structure 54.

The silicon nitride layer 60 can be larger than the peripheral regions 70 of the polysilicon film. As a result, the silicon nitride layer 60 can extend out beyond the polysilicon film. Furthermore, gaps 78 are created in between the peripheral regions 70 of the polysilicon film and the central region 64 of the polysilicon film. In the areas of the gaps 78, no polysilicon film is present and the underlying silicon nitride layer 60 is exposed. As a result, it will be understood that the gaps 78 electrically isolate the peripheral regions 70 of the polysilicon film from the central region 64 of the polysilicon film.

Referring to FIG. 3 in conjunction with FIG. 2, it can be seen that the peripheral regions 70 of polysilicon film that are coupled to the driven electrode 72 collect charge and are drawn to the substrate 52 (FIG. 2) when an electrical potential is applied across the air gap 58 below the membrane structure 54. However, since the central region 64 of polysilicon film is coupled to a ground electrode 74, no charge collects in that region. That region is therefore not biased toward the below-lying substrate when an electrical potential is applied. The result is that only the regions of the membrane structure 54 coated with the peripheral area 70 of the polysilicon film are drawn toward the substrate 52 and act to deform the silicon nitride layer 60. Since no deformation occurs in the center of the membrane structure 54, the membrane structure 54 deforms in a uniform manner, thereby creating a uniform reflection.

Figure 4:
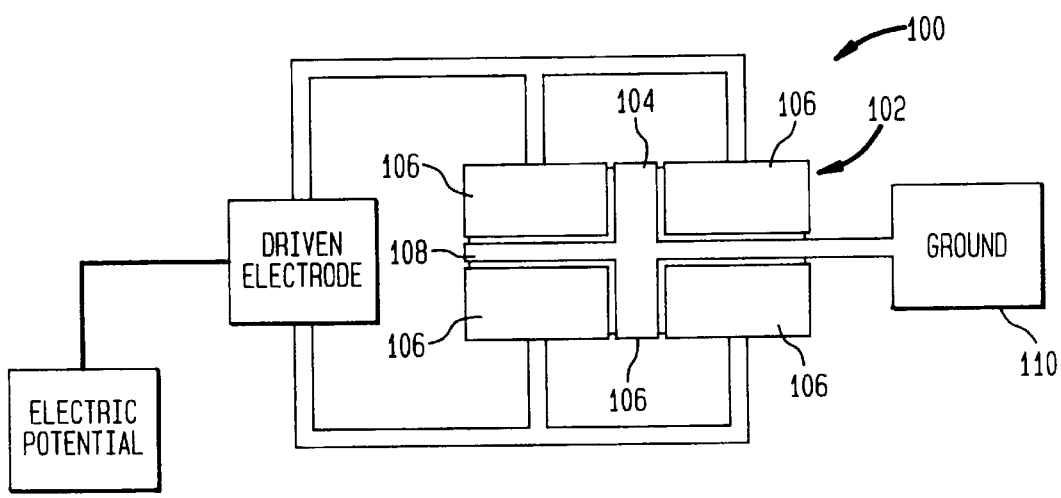
FIG. 4 is a top view of an alternate embodiment of an improved MARS modulator in accordance with the present invention.

Referring to FIG. 4, there is shown an alternate embodiment of a MARS modulator 100. In this embodiment, the MARS modulator 100 is a double supported beam MARS modulator. The membrane structure 102 of such a modulator is rectangular. To adapt to present invention to this modulator configuration, a central area 104 of polysilicon film is created would include a rectangular center 106 with a traverse line 108 that extends across the center of the membrane structure 102. The presence of the central area 104 of polysilicon film divides the membrane structure 102 into four separate quadrants. Each of the quadrants is filled with peripheral areas 106 of polysilicon film. The central area 104 of polysilicon film is coupled to a ground electrode 110. The peripheral areas 106 of the polysilicon film are coupled to a driven electrode 112.

As has been previously explained, when an electrical potential is applied to the membrane structure 102, only the peripheral areas 106 are influenced. The peripheral areas 106 then act to deform the membrane structure 102. The central region 104 does not deform. Accordingly, the deformation is controlled and the membrane structure 102 deforms in a uniform manner.

In the embodiments of FIG. 2 and FIG. 3, the different areas of polysilicon film are shown applied to both the top surface and the bottom surface of the silicon nitride membrane. Such a configuration is only exemplary and it should be understood that the polysilicon film need only be present one surface of the membrane structure, e.g., the top or bottom surface of the silicon nitride membrane.

To manufacture a MARS modulator in accordance with the present invention, the membrane structure is coated with a solid polysilicon film. The polysilicon film can be applied to one surface of the membrane structure or to both the top and bottom surfaces of the membrane structure. Once the polysilicon film is in place, the separate regions of the film are created selectively removing the polysilicon film in the area of the gaps between adjacent sections. The areas in the center of the membrane structure are then coupled to a grounded electrode. The remaining peripheral area are coupled to a driven electrode, thereby creating a membrane structure such as that before described.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A membrane structure for use in an optical modulator, comprising:
    a flexible membrane having peripheral regions and a centrally located central region;
    a first area of conductive material disposed on said flexible membrane in said central region;
    one or more second areas of conductive material disposed on said flexible membrane in said peripheral regions, wherein said one or more second areas of conductive material share a common electrical potential and are electrically isolated from said first area of conductive material.

2. The membrane structure according to claim 1, wherein said flexible membrane is a dielectric.

3. The membrane structure according to claim 1, wherein said first area of conductive material and said at least one second area of conductive material are transparent.

4. The membrane structure according to claim 1, wherein said first area of conductive material and said at least one second area of conductive material are deposited in a generally equivalent thickness on said flexible membrane.

5. The membrane structure according to claim 1 wherein said first area of conductive material and said at least one second area of conductive material are the same conductive material.

6. The membrane structure according to claim 5, wherein said same conductive material includes polysilicon.

7. The membrane structure according to claim 5, wherein said same conductive material includes indium tin oxide.

8. The membrane structure according to claim 1, wherein said flexible membrane includes silicon nitride.

9. The membrane structure according to claim 1, wherein said flexible membrane has a top surface and a bottom surface and said first area of conductive material is disposed on both said top surface and said bottom surface, wherein said first area of conductive material on both surfaces is electrically interconnected.

10. The membrane structure according to claim 1, wherein said flexible membrane has a top surface and a bottom surface and said at least one second area of conductive material is disposed on both said top surface and said bottom surface, wherein said at least one second area of conductive material on both surfaces is electrically interconnected.

11. A modulator for modulating an optical signal, comprising:
    a substrate;
    a flexible membrane having a top surface, a bottom surface, a central region and peripheral regions surrounding said central region, wherein said flexible membrane is suspended over said substrate;
    a first area of conductive material disposed on at least one surface of said flexible membrane in said central region; and
    one or more second areas of conductive material disposed on at least one surface of said flexible membrane in said peripheral regions, wherein said one or more second areas of conductive material share a common electrical potential and are electrically isolated from said first area of conductive material.

12. The modulator according to claim 11, further including a source of electrical potential for applying a predetermined electrical potential between said substrate and said at least one second area of conductive material.

13. The modulator according to claim 12, further including an electrical ground coupled to said first area of conductive material.

14. The modulator according to claim 11, wherein said flexible membrane is a dielectric.

15. The modulator according to claim 11, wherein said first area of conductive material and said at least one second area of conductive material are transparent.

16. The modulator according to claim 11, wherein said first area of conductive material and said at least one second area of conductive material contain the same conductive material.

17. The modulator structure according to claim 16, wherein said same conductive material includes polysilicon.

18. The modulator structure according to claim 16, wherein said same conductive material includes indium tin oxide.

19. The modulator according to claim 11, wherein said flexible membrane includes silicon nitride.

20. The modulator according to claim 11, wherein said first area of conductive material is disposed on said top surface and said bottom surface of said flexible membrane, said conductive material on said top surface and said bottom surface being electrically coupled.

21. The modulator according to claim 11, wherein said at least one second area of conductive material is disposed on said top surface and said bottom surface of said flexible membrane, said conductive material on said top surface and said bottom surface being electrically coupled.

22. The modulator according to claim 11, wherein said modulator is designed to operate at a predetermined frequency of light and wherein said first area of conductive material and said at least one second area of conductive material are deposited in a thickness that is an even multiple of ¼ the wavelength of said predetermined frequency.

23. A method of manufacturing an optical modulator:

providing a substrate;

providing a flexible membrane having a top surface, a bottom surface, a central region and peripheral regions surrounding said central region; and placing a first area of conductive material on said central region of said flexible membrane;

placing one or more second areas of conductive material on said peripheral region of said flexible membrane, wherein said one or more second areas of conductive material shares a common electrical potential and is electrically isolated from said first area of conductive material; and coupling said first area of conductive material to ground.

24. The method according to claim 23 further including the step of coupling said at least one second area of conductive material to an electrical potential different than said first area of conductive material.

* * * * *